United States Patent [19]

Matsuyama et al.

[11] 4,364,168
[45] Dec. 21, 1982

[54] METHOD OF FABRICATING LIQUID CRYSTAL DISPLAY CELL

[75] Inventors: Shigeru Matsuyama; Ken Sasaki, both of Mobara, Japan

[73] Assignee: Hitachi, Ltd., Tokyo, Japan

[21] Appl. No.: 189,715

[22] Filed: Sep. 22, 1980

[30] Foreign Application Priority Data

Nov. 26, 1979 [JP] Japan .................................. 54-152076

[51] Int. Cl.³ ............................................... G02F 1/13
[52] U.S. Cl. .................................... 29/592 R; 350/343
[58] Field of Search ......................... 29/592 R; 350/343; 53/440

[56] References Cited

U.S. PATENT DOCUMENTS

| | | | |
|---|---|---|---|
| 2,028,241 | 1/1936 | Paul | 53/440 |
| 2,503,944 | 4/1950 | Frascari | 53/440 |
| 3,952,405 | 4/1976 | Vest | 29/592 |
| 3,990,782 | 11/1976 | Yamasaki | 350/343 |
| 4,222,635 | 9/1980 | Julke | 350/343 |

*Primary Examiner*—Lowell A. Larson
*Attorney, Agent, or Firm*—Antonelli, Terry and Wands

[57] ABSTRACT

A pair of substrates each provided with an electrode film are adhered to each other at their peripheral portions through a sealing material to form an envelope. A liquid crystal material is injected into the envelope from a liquid crystal material injection port which is provided in a localized part of the sealing material. Then, the envelope is heated to a temperature higher than the normal room temperature, and a photosensitive curing adhesive is applied to the injection port while maintaining the envelope at the elevated temperature. After the application of the adhesive, the envelope is cooled to a temperature in the vicinity of the normal room temperature. Subsequently, the adhesive is hardened through irradiation of light at a temperature in the vicinity of the normal room temperature to hermetically seal the injection port, thereby finishing a liquid crystal display cell. Alternatively, the photo-sensitive curing adhesive may be applied at a temperature in the vicinity of the normal room temperature and then hardened at a temperature lower than normal room temperature.

10 Claims, 4 Drawing Figures

METHOD OF FABRICATING LIQUID CRYSTAL DISPLAY CELL

The present invention relates to a method of fabricating a liquid crystal display cell, and more particularly to the sealing of a liquid crystal material injection port.

The prior art as well as the present invention will be explained referring to the accompanying drawings, in which.

Figure 2:
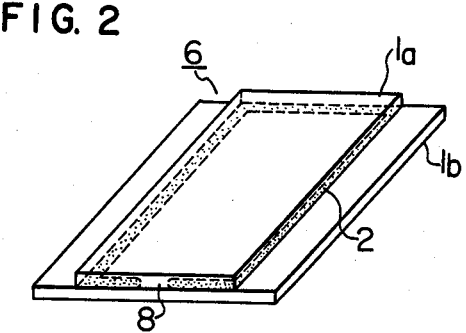
FIG. 2 is a perspective view of a liquid crystal display cell for generally explaining a method of fabricating the cell.

Referring to FIG. 2 for generally explaining a method of fabricating a liquid crystal display cell, two transparent glass substrates 1a and 1b each provided with a display electrode pattern of conductive film are adhered to each other at their peripheral portions through a sealing material 2 with a constant spacing between the glass substrates 1a and 1b, thereby forming an envelope 6. The application of the sealing material 2 is omitted at an appropriate position in the peripheral portion of the envelope 6 to provide a liquid crystal material injection port 8. After a liquid crystal material has been injected from the injection port 8 into the envelope 6, the injection port 8 is hermetically sealed.

In a conventional method of hermetically sealing the injection port 8, a metal film is deposited in and around the injection port 8 through evaporation techniques, and the injection port is then sealed by means of an alloy such as solder having a low melting point. In the case where an organic adhesive is employed for the sealing material 2, however, the sealing of the injection port 8 by solder is difficult because the organic adhesive cannot withstand an operating temperature of the solder. Accordingly, in recent years, an epoxy resin or the like, which is usually of thermosetting type, has been employed to seal the injection port 8.

Figure 3:
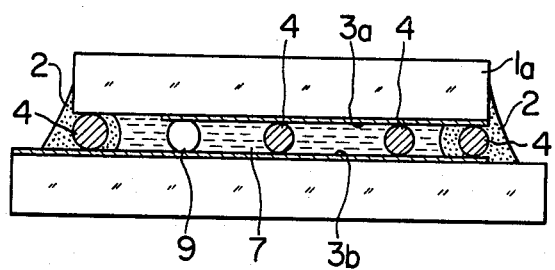
FIG. 3 is a sectional view showing an example of liquid crystal display cells fabricated in accordance with the conventional method, when it is placed under low temperatures.

In a recent type of liquid crystal display cell, many spacers 4 as shown in FIG. 3 are dispersed on the surface of one of the opposite glass substrates to keep a constant spacing therebetween. Such a structure is needed for a cell with a relatively large display area, for example, a cell for use in a large-size desktop computer or a matrix type display. Reference symbols 3a and 3b in FIG. 3 designate facing electrode patterns each formed of a transparent conductive film.

Figure 4:
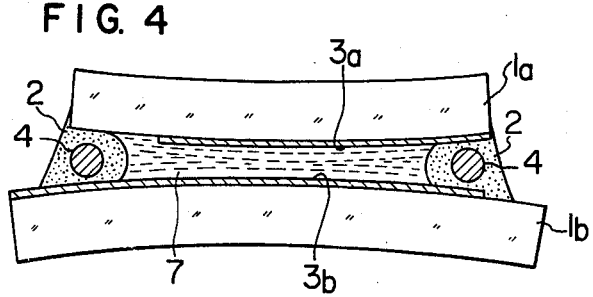
FIG. 4 is a sectional view showing another example of liquid crystal display cells fabricated in accordance with the conventional method, when it is placed under low temperatures.

The cell with such a structure, however, has encountered a problem that when the cell is placed in low temperature environments of, for example, −30° to −40° C., bubbles are generated in the cell. In more detail, a minimum spacing between the opposite glass substrates is determined or fixed by the dispersed spacers 4. Therefore, when the cell is maintained at low temperatures, a liquid crystal material 7 shrinks so that bubbles 9 are generated. The generation of bubbles is remarkable in a cell whose injection port is sealed by thermosetting type resins, since the liquid crystal material in the cell is put under reduced pressure even at the normal room temperature. On the other hand, a cell such as shown in FIG. 4, having few or no many dispersed spacers between the glass substrates 1a and 1b, generates no bubbles but is subjected to such deformation as warping each of the glass substrates 1a and 1b outward due to the shrinkage of the liquid crystal material 7, when it is placed in low temperature environments. In other words, the cell containing many dispersed spacers is never subjected to deformation because the gap between the glass substrates is fixed by the dispersed spacers 4, and therefore must generate bubbles.

An object of the present invention is to provide a method of fabricating a liquid crystal cell which can prevent the generation of bubbles or can minimize the deformation of the cell.

According to the present invention, there is provided a method of fabricating a liquid crystal display cell, comprising the sequential steps of, adhering opposite substrates to each other at their peripheral portions through a sealing material while providing a liquid crystal material injection port at a localized part of said sealing material, injecting a liquid crystal material from said injection port, applying a photo-sensitive curing adhesive to said injection port at a first preselected temperature, and hardening said photo-sensitive curing adhesive at a second preselected temperature lower than said first preselected temperature to hermetically seal said injection port, thereby completing a liquid crystal display cell.

Figure 1:
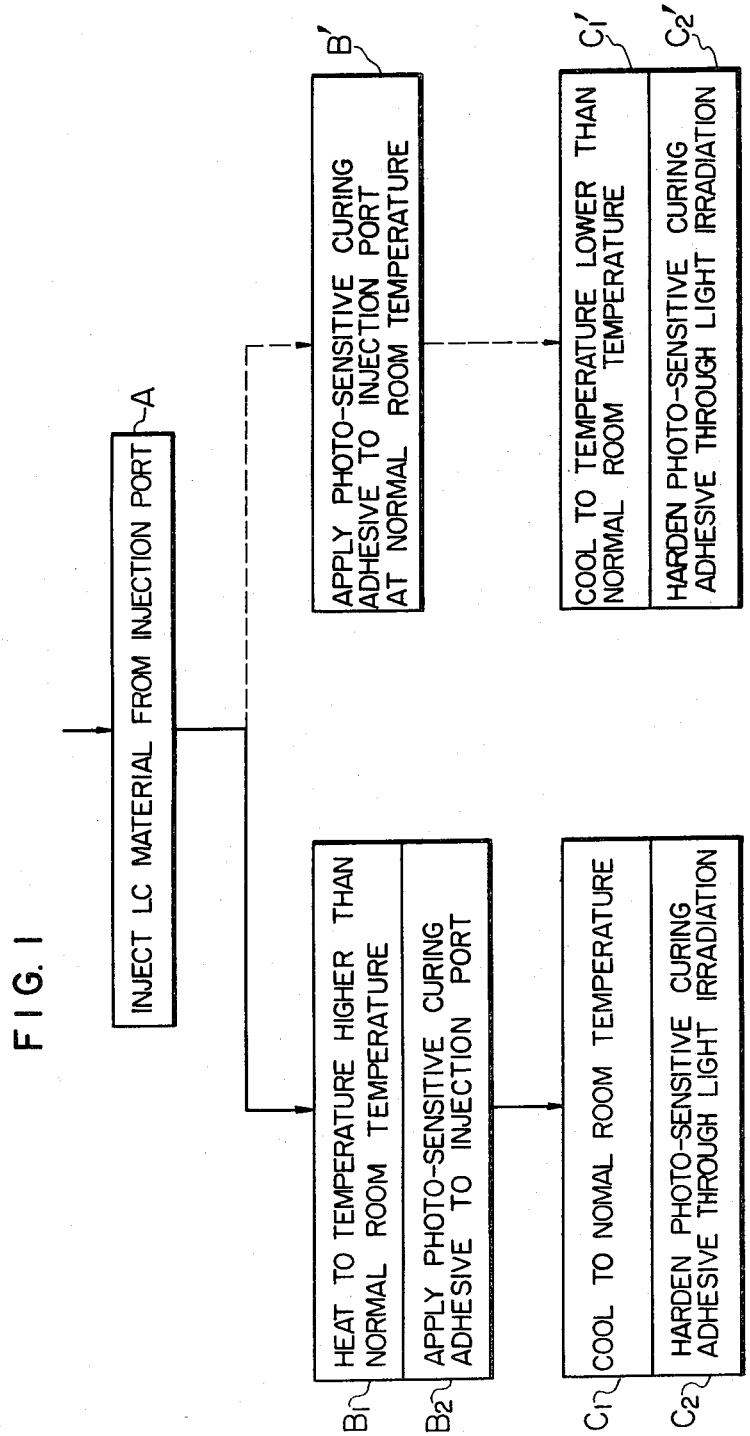
FIG. 1 is a flow chart for showing the main steps in a method for fabrication of a liquid crystal display cell according to the present invention.

A fabrication process of a liquid crystal display cell according to the present invention will be briefly explained referring to FIGS. 1 and 2. As is well known, the process comprises a step of forming the structure of FIG. 2 in a well-known manner and a step of injecting a liquid crystal material from the injection port 8 of FIG. 2 into the envelope 2 in a well-known manner (step A in FIG. 1). A first preferred embodiment of the process comprises a step of heating the envelope 6 to a temperature higher than the normal room temperature, preferably, a temperature higher than the normal room temperature by 10° to 25° C. (step B1 in FIG. 1), a step of applying a photo-sensitive curing adhesive to the neighborhood of the injection port 8 while maintaining the envelope 6 at the elevated temperature (step B2), a step of thereafter cooling the envelope 6 to a temperature equal to or near the normal room temperature (step C1), and a step of irradiating the photo-sensitive curing adhesive with light at the lowered temperature to harden the adhesive (step C2). In a second preferred embodiment, the process comprises a step of applying a photo-sensitive curing adhesive at a temperature equal to or near the normal room temperature (step B' in FIG. 1) and a step of thereafter cooling the envelope 6 to a temperature lower than the normal room temperature, preferably, a temperature lower than the normal room temperature by 15° to 30° C., to harden the photo-sensitive curing adhesive at the lowered temperature (steps C' and C2'). The term "normal room temperature" and throughout the specification means a temperature of 20° C. to 25° C.

Next, the present invention will be explained on the basis of the following examples.

EXAMPLE I

An upper glass substrate was immersed into a solution containing glass fibers dispersed and mixed in isopropyl alcohol (IPA), to disperse the glass fibers (or the spacers) on the glass substrate. Next, an epoxy base sealing material was applied to peripheral portion of each of upper and lower glass substrates which were in turn placed face to face with each other and were brought into an adhering condition to form an envelope. Subsequently, a liquid crystal material was injected into the envelope from a liquid crystal material injection port which is provided in a side face of the envelope. Then, the cell was heated to and maintained at a temperature higher than the normal room temperature by 10° to 25° C., for example, 40° C. An acrylic photosensitive curing adhesive containing β-methylanthraquinone as a sensitizer was then applied to the neighborhood of the injection port while maintaining the envelope at the elevated temperature. Then, the envelope was cooled to the normal room temperature and irradiated with light to harden the adhesive. An ultra-high pressure mercury vapor lamp, high pressure mercury vapor lamp, or mercury vapor lamp may be employed as an illuminating light source. When the envelope is irradiated with light, care is to be taken so that the temperature of the envelope does not exceed 5° C. or more from the normal room temperature. In the case where the temperature of the envelope is raised too high, a part of the envelope to which the adhesive is applied, may be cooled by means of a blower. Alternatively, the envelope may be placed within a quartz vessel surrounded by such a proper medium as water in order that radiant heat from the light source is prevented from reaching the envelope.

The thus fabricated liquid crystal display cell generated no bubble when cooled to and placed at temperatures within a range from the normal room temperature to −30° or −40° C.

Another proper photo-sensitive curing adhesive includes LOCTITE #358 mainly containing polyacrylate or LOCTITE #354 mainly containing modified acrylate, which is available from Nippon Loctite Corp.

EXAMPLE II

A non-saturated polyester photo-sensitive curing adhesive containing benzoinbutylether as a sensitizer was applied to the neighborhood of the injection port while maintaining the envelope at a temperature higher than the normal room temperature by 10° to 25° C. The same steps as Example I were conducted to form a liquid crystal display cell.

The thus fabricated cell generated no bubbles when cooled to and placed at temperatures within a range from the normal room temperature to −30° or −40° C.

The present inventors have prepared a large number of samples in such a manner that the hardening temperature of photo-sensitive curing adhesive is fixed to a temperature equal to or near the normal room temperature while the application temperature of the adhesive is taken as a variable parameter. The rate of generation of initial leakage and the rate of generation of bubbles at low temperatures were measured for these samples. The results of measurement are shown in Table I. Further, a large number of samples have been prepared in such a manner that the application temperature of photo-sensitive curing adhesive is fixed to a temperature higher than the normal room temperature by 10° to 25° C. while the hardening temperature of the adhesive is taken as a variable parameter. The rate of generation of bubble at low temperature was measured on those samples and the results of measurement are shown in Table II.

TABLE I (Hardening Temp. of Adhesive: 20° to 25° C.)

| Application Temp. of Adhesive | Generation of Initial Leakage | Generation of Bubble at −30° C. | Generation of Bubble at −40° C. |
|---|---|---|---|
| 20° C. | 4 to 15% | 0% | 0% |
| 30° C. | 0% | 0% | 0% |
| 45° C. | 0% | 0% | 0% |
| 50° C. | 0% | 10% | 10% |

TABLE II (Application Temp. of Adhesive: 40° C.)

| Hardening Temp. of Adhesive | Generation of Bubble at −30° C. | Generation of Bubble at −40° C. |
|---|---|---|
| 20° to 25° C. (normal room temp.) | 0% | 0% |
| 40° C. | 0% | 2 to 3% |
| 50° C. | 20% | 50% |
| 60° C. | 30% | 70% |

It is seen from Table I that, when a photo-sensitive curing adhesive is hardened at a temperature near the normal room temperature, it must be applied at a temperature higher than the normal room temperature by about 10° C. or more, in order to surely obtain hermetic sealing. It seems that the adhesive can be sucked into the injection port due to a temperature change (or temperature difference) in cooling the cell from the adhesive application temperature to the hardening normal room temperature, thereby providing a sure hermetic sealing. However, in a sample in which the adhesive was applied at a temperature of 50° C., hermetic sealing could be obtained but bubbles were generated at low temperatures.

It is seen from Table II that when the photo-sensitive curing adhesive is applied at a temperature higher than the normal room temperature by 10° to 25° C., its hardening temperature must be maintained near the normal room temperature to prevent the generation of bubbles.

At temperatures lower than −40° C., the liquid crystal material was solidified and hence the above measurements were impossible for such temperatures.

It is evident from the above-described first embodiment that good results can be obtained by applying a photo-sensitive curing adhesive at a temperature higher than the normal room temperature and thereafter hardening the adhesive at a temperature equal to or near the normal room temperature. Similar results of the prevention of the generation of bubbles have been obtained by applying a photo-sensitive curing adhesive in the vicinity of the normal room temperature and thereafter hardening the adhesive at a temperature lower than the normal room temperature (preferably, a temperature lower than the normal room temperature by 15° to 30° C., for example, −5° C.), in accordance with the second embodiment. In a case where a thermosetting adhesive is employed, the adhesive must be hardened at high temperatures since its hardening is based upon addition polymerization. On the other hand, a photo-sensitive curing adhesive whose hardening is based on free radical reaction, may be hardened at low temperatures so long as it is irradiated with light.

Thus, in the case where a photo-sensitive curing adhesive is employed, no restriction is imposed on the hardening temperature of the adhesive. On the other hand, the suction of the applied adhesive into a liquid crystal material injection port to fill the injection port with the adhesive is enabled by lowering the adhesive hardening temperature to less than the adhesive application temperature to utilize the reduced pressure condition of the filled liquid crystal material due to the temperature difference contained therein. Accordingly, the present invention can be generally embodied by applying a photo-sensitive curing adhesive to a liquid crystal material injection port at a first preselected temperature and thereafter hardening the applied adhesive at a second preselected temperature lower than the first preselected temperature.

In the above-described examples, cells having a structure such as shown in FIG. 3, namely, a structure in which many spaces are dispersed between a pair of substrates, has been explained. However, it is needless to say that the present invention is also applicable to such a structure as shown in FIG. 4 which includes few or no many dispersed spacers. An effect obtained in this case is to minimize the degree of deformation of a cell such as shown in FIG. 4.

What is claimed is:

1. A method of fabricating a liquid crystal display cell, comprising the sequential steps of:

adhering opposite and spaced substrates to each other at their peripheral portions through a sealing material while providing an envelope for receiving a liquid crystal material and a liquid crystal material injection port at a localized part of the peripheral portion sealed by said sealing material;

injecting a liquid crystal material into said envelope from said injection port;

applying a photo-sensitive curing adhesive to said injection port at a first preselected temperature; and hardening said photo-sensitive curing adhesive at a second preselected temperature lower than said first preselected temperature to hermetically seal said injection port, thereby completing a liquid crystal display cell.

2. A method according to claim 1, wherein said first preselected temperature is higher than the normal room temperature and said second preselected temperature is approximately the normal room temperature.

3. A method according to claim 2, wherein said first preselected temperature is higher than the normal room temperature by 10° to 25° C.

4. A method according to claim 1, wherein said first preselected temperature is approximately the normal room temperature and said second preselected temperature is lower than the normal room temperature.

5. A method according to claim 4, wherein said second preselected temperature is lower than the normal room temperature by 15° to 30° C.

6. A method according to any one of claims 1 to 5, wherein said photo-sensitive curing adhesive includes an acrylic adhesive containing β-methylanthraquinone as a sensitizer.

7. A method according to any one of claims 1 to 5, wherein said photo-sensitive curing adhesive is a non-saturated polyester adhesive containing benzoinbutylether as a sensitizer.

8. A method according to claim 1, wherein said envelope is filled with said liquid crystal material during said injection from said injection port and the photo-sensitive curing adhesive is drawn into said port during reduction of said temperatures.

9. A method according to claim 1, wherein the photo-sensitive curing adhesive is cured by light radiation.

10. A method according to claim 1, wherein the difference between the first preselected temperature and the second preselected temperature is controlled to prevent generation of bubbles and distortion in the liquid crystal display cell when subjected to low temperatures.

* * * * *